United States Patent [19]
Ifuku et al.

[11] 4,433,133
[45] Feb. 21, 1984

[54] PROCESS FOR PRODUCING CROSSLINKED UREA-FORMALDEHYDE POLYMER PARTICLES

[75] Inventors: Naoyuki Ifuku; Akio Kurokawa; Kenzo Seita, all of Yokohama; Kaoru Usami, Kamakura; Naoyuki Aikawa, Yokohama, all of Japan

[73] Assignee: Mitsui Toatsu Chemicals, Inc., Tokyo, Japan

[21] Appl. No.: 479,811

[22] Filed: Mar. 28, 1983

[51] Int. Cl.$^3$ ............................................. C08G 12/12
[52] U.S. Cl. ................................... 528/232; 524/733; 528/242
[58] Field of Search ................. 528/232, 242; 524/733

[56] References Cited

U.S. PATENT DOCUMENTS

| | | | |
|---|---|---|---|
| 3,928,272 | 12/1975 | Brancato et al. | 528/232 |
| 3,931,063 | 1/1976 | Renner | 524/733 X |
| 3,953,421 | 4/1976 | Berstein | 528/242 X |
| 4,035,328 | 7/1977 | Huang et al. | 528/232 X |

Primary Examiner—Lucille M. Phynes
Attorney, Agent, or Firm—Fisher, Christen & Sabol

[57] ABSTRACT

Disclosed is a process for producing fine particles of crosslinked urea-formaldehyde polymer which comprises the steps of synthesizing a precondensate of urea and formaldehyde, allowing the precondensate to react by the addition of an aqueous solution of an acid catalyst, and then neutralizing the reaction mixture, characterized in that the filtrate obtained in the filtration step for separating the polymer particles is recycled to the reaction system at the step of synthesizing a precondensate of urea and formaldehyde and/or the step of allowing the precondensate to react by the addition of an aqueous solution of an acid catalyst and in that the precondensate is obtained by reaction 1 mole of urea with 1.4 to 1.9 moles of formaldehyde at a pH of 6 to 10 and a temperature of 10 to 95° C.

While such fine particles of crosslinked urea-formaldehyde polymer are useful as a filler for improving certain properties (such as opacity and the like) of paper, disposal of the filtrate resulting from the filtration step for separating the polymer particles has been a serious problem. The disclosed process is carried out in a closed system by recycling of the filtrate and, moreover, the resulting polymer is in the form of fine particles having a diameter of 0.1 to 1.0 μ and hence meets the requirements for a filler of paper (i.e., the capability of improving the opacity and other properties of paper).

10 Claims, No Drawings

PROCESS FOR PRODUCING CROSSLINKED UREA-FORMALDEHYDE POLYMER PARTICLES

TECHNICAL FIELD

This invention relates to a process for producing crosslinked urea-formaldehyde polymer particles useful as a filler of paper.

BACKGROUND ART

It is well known that fine particles of crosslinked urea-formaldehyde polymer having a diameter of 0.1 to 1.0μ are useful as the so-called filler which is added to paper for the purpose of improving certain properties (such as opacity and the like) thereof. One process for producing crosslinked urea-formaldehyde polymer particles is disclosed in Japanese Patent Laid-Open No. 135893/'79. According to this process, a precondensate solution is prepared by mixing an aqueous formaldehyde solution, urea, sodium carboxymethyl cellulose and water, adjusting the resulting mixture to pH 7 with an aqueous solution of sodium hydroxide, and then allowing it to react. Using an in-line mixer, this precondensate solution is continuously mixed with an aqueous solution of sulfuric acid having a concentration of several percent by weight. Before commencement of its solidification, the resulting mixture is fed onto a moving endless belt made of acid resistant rubber and allowed to solidify (gel) thereon. After the addition of water to the solidified gel-like material thus obtained, the resulting mixture is stirred to form a slurry. This slurry is neutralized with an aqueous alkaline solution and then ground in a colloid mill to obtain a dispersion of crosslinked urea-formaldehyde polymer particles (hereinafter referred to as a filler dispersion).

The filler dispersion thus obtained usually contains 90 to 95% by weight of water, thus requiring great expenses for transportation and storage. Accordingly, it has been common practice to dehydrate the filler dispersion by means of a filtering device and thereby separate it into cake and filtrate which is then discarded.

However, since the filtrate contains organic materials such as unreacted formaldehyde and urea, direct discharge thereof may cause environmental pollution. For this reason, the filtrate has been discharged after being disposed of by biodegradation and the like. Since this waste water disposal is very expensive, it would be desirable to establish a process in which the filtrate is effectively utilized instead of being discharged out of the system as waste water.

The present inventors have made repeated studies on this subject and have found that, in order to utilize the filtrate effectively, it must be reused at a fixed stage of the reaction. And yet, even if the filtrate is reused at a fixed stage of the reaction, the resulting crosslinked urea-formaldehyde polymer particles may occasionally contain a considerable amount of particles having a diameter of greater than 1μ. It has been found that such a product fails to produce a satisfactory improvement in certain properties (such as opacity and the like) of paper. As a result of further studies on this point, the present inventors have found that crosslinked urea-formaldehyde polymer particles having a diameter of 0.1 to 1.0μ can be obtained only by reusing the filtrate at a fixed stage of the reaction and, at the same time, using a specified type of precondensate. The present invention has been completed on the basis by these discoveries.

DISCLOSURE OF THE INVENTION

It is an object of the present invention to provide a process for producing crosslinked urea-formaldehyde polymer particles in a closed system from which waste water containing organic materials such as unreacted urea, formaldehyde and the like is not discharged.

It is another object of the present invention to provide a process for producing crosslinked urea-formaldehyde polymer particles having a diameter of 0.1 to 1.0μ which are useful as a filler for improving certain properties (such as opacity and the like) of paper.

According to the present invention, there is provided a process for producing fine particles of crosslinked urea-formaldehyde polymer which comprises the steps of synthesizing a precondensate of urea and formaldehyde, allowing the precondensate to react by the addition of an aqueous solution of an acid catalyst, and then neutralizing the reaction mixture, characterized in that the filtrate resulting from the filtration step for separating the polymer particles is added to the reaction system at a stage of the reaction prior to the formation of a solid material consisting of crosslinked urea-formaldehyde polymer particles and in that the precondensate is obtained by reacting 1.0 mole of urea with 1.4 to 1.9 moles of formaldehyde at a pH of 6 to 10 and a temperature of 10° to 95° C.

BEST MODE FOR CARRYING OUT THE INVENTION

Prior to the description of the process of the present invention, a typical prior art process is set forth according to the sequence of steps.

First of all, a precondensate is synthesized according to conventional procedure (this step is hereinafter referred to as step A). For example, a precondensate solution is prepared by dissolving a high-molecular compound (such as sodium carboxymethyl cellulose) in water (hereinafter referred to as water A), adding formaldehyde and urea to the aqueous solution, adjusting the resulting mixture to pH 7, and then allowing it to react at 70° C. for 2 hours. In this step of synthesizing a precondensate, formaldehyde and urea are conventionally used in a molar ratio (F/U) ranging from 1.0 to 2.0.

In the succeeding step B, the above precondensate solution is solidified by means of an acid catalyst. More specifically, an aqueous solution of an acid catalyst (such as sulfuric acid or the like) is added to and mixed with the precondensate solution. Then, solidification usually begins within several minutes, as evidenced by the clear solution becoming turbid. The resulting solid material consists of agglomerates of fine particles of urea-formaldehyde polymer having a diameter of 0.1 to 1.0μ. Accordingly, if the precondensate solution having an unvolatile component content of, for example, as high as 25% by weight is subjected to solidification reaction without addition of water, a hard gel will be formed. Such a hard gel interferes with the following steps of crushing the gel coarsely to form a slurry and then grinding this slurry finely, which makes industrial production practically impossible. For this reason, it is necessary to add diluent water (hereinafter referred to as water B) to the reaction system prior to the formation of a solid material. This water B may be added to the precondensate solution or used as a diluent for the acid catalyst. By way of example, as described in Japanese Patent Laid-Open No. 135893/'79, an in-line mixer is used to mix the precondensate solution continuously with an aqueous solution of sulfuric acid having a concentration of several percent by weight. Before commencement of its solidification, the resulting mixture is fed onto a moving endless belt made of acid resistant rubber and allowed to solidify (gel) thereon.

Next, a slurry is formed in step C. More specifically, water (hereinafter referred to as water C) is added to the solidified gel-like material obtained in step B and the resulting mixture is stirred, usually for several hours, to form a slurry. Thereafter, if necessary, the slurry is subjected to step D (for the removal of free formaldehyde). By way of example, as described in Japanese Patent Laid-Open No. 36231/'80, urea dissolved in water (which is used to facilitate the reaction and hereinafter referred to as water D) is added to the slurry so that any free formaldehyde may be removed. Then, the slurry is neutralized by the addition of an aqueous solution of sodium hydroxide or the like. Alternatively, as described in Japanese Patent Laid-Open No. 131658/'81, free formaldehyde may also be removed by treatment with ammonium compound. At this stage, the solid material contained in the slurry consists of agglomerates ranging in size from 0.01 to several millimeters, each of the agglomerates being composed of fine particles (hereinafter referred to as primary particles) having a diameter of 0.1 to 1.0$\mu$. Accordingly, the slurry is ground in a colloid mill or the like to reduce the agglomerates to finer ones (hereinafter referred to as secondary particles) having an average diameter of 1 to 10$\mu$ (grinding step). Thus, there is obtained a dispersion which usually contains 5 to 10% by weight of crosslinked urea-formaldehyde polymer particles and is useful as a filler of paper. Then, this dispersion is dehydrated by means of a filtering device to obtain filter cake as a final product. (This filter cake usually has an unvolatile component content of approximately 25% by weight and, hence, hereinafter referred to simply as "Ca. 25% cake".) Generally, approximately 40 parts by weight of ca. 25% cake and approximately 60 parts by weight of filtrate are obtained from 100 parts of the dispersion.

The composition of the filtrate depends on whether step D is included or not. Where step D is included, the filtrate usually comprises 200 to 500 ppm of free formaldehyde, 2 to 4% of a low-molecular-weight compound of urea and formaldehyde, and 1 to 4% of an inorganic salt (sodium sulfate or ammonium sulfate). On the other hand, where step D is omitted, the filtrate usually comprises 5,000 to 7,000 ppm of free formaldehyde, 1 to 2% of a low-molecular-weight compound of urea and formaldehyde, and 1 to 4% of an inorganic salt.

This prior art process for producing crosslinked urea-formaldehyde polymer particles has been described for reference purposes so as to facilitate the understanding of the process of the present invention which will be described hereinbelow, and should not be construed to limit the scope of application of the present invention. It is to be understood that the present invention is applicable to all of the conventionally known processes for producing crosslinked urea-formaldehyde polymer particles.

In order to accomplish the objects of the present invention, the following two requirements must be satisfied.

The first requirement is that the filtrate obtained from the filtration of the slurry must be reused at a stage of the reaction prior to the formation of a solid material (urea-formaldehyde polymer particles), i.e., at step A and/or step B. It has been unexpectedly found that, if the filtrate is reused at a stage of the reaction subsequent to the formation of a solid material, i.e., at step C and/or step D, the resulting product exhibits a marked impairment of its performance as a filler. In other words, it fails to bring about a satisfactory improvement in certain properties (such as opacity and the like) of paper. In contrast, if the filtrate is reused at a stage of the reaction prior to the formation of a solid material, the resulting product has significantly better performance as a filler than in the above-described case. However, a completely satisfactory product cannot be obtained unless the following second requirement is satisfied.

The second requirement is that a precondensate as specified below must be used. That is, the precondensate used in the process of the present invention must be one obtained under such reaction conditions that the molar ratio (F/U) of formaldehyde to urea is in the range of 1.4 to 1.9, the pH is in the range of 6 to 10, and the temperature is in the range of 10° to 95° C. In this precondensate synthesis step, the preferred molar ratio (F/U) range is from 1.5 to 1.8, the preferred pH range is from 7 to 9, and the preferred temperature range is from 50° to 80° C. If the molar ratio of the precondensate is lower than 1.4, the product obtained by reusing (or recycling) the filtrate in place of water A or water B exhibits a more marked impairment of its performance as a filler as the number of recycles increases. On the other hand, if the molar ratio of the precondensate is greater than 1.9, the product obtained by reusing the filtrate in place of water A or water B shows no change in performance as a filler in spite of repeated recycling of the filtrate, but the yield of the product comprising the water-insoluble component of the filler dispersion is reduced to such an extent as to be unsuitable for industrial production. It is to be understood that, in calculating the molar ratio (F/U) of the precondensate, the urea and formaldehyde, or the reaction product thereof, contained in the filtrate reused in place of water A or water B should be excluded.

If the temperature used in the synthesis of a precondensate is lower than 10° C., part of the reaction product tends to precipitate from the reaction mixture. Where this precipitate remains in step B (solidification step), the resulting product exhibits an impairment of its performance as a filler. On the other hand, if the temperature used in the synthesis of a precondensate is higher than 95° C., the reaction is difficult to control. Thus, the resulting product also exhibits an impairment of its performance as a filler, probably due to an excessive degree of condensation.

If the pH used in the synthesis of a precondensate is lower than 6 or higher than 10, a product having desirable performance as a filler cannot be obtained. The pH adjustment in the precondensate synthesis step can be carried out by adding an aqueous solution of sodium hydroxide or sulfuric acid to the reaction mixture while monitoring its pH with an ordinary glass electrode pH meter.

The reaction time for the synthesis of a precondensate is a factor determined by the combination of temperature and pH used. It is necessary to use an appropriate reaction time because both excessively long and excessively short reaction times result in a product having poor performance as a filler. For example, it is desirable to use a reaction time of 5 to 10 minutes when the pH is 6.0 or 10.0 and the temperature is 95° C. On the other hand, it is desirable to use a reaction time of 5 to 10 hours when the pH is 6.0 or 10.0 and the temperature is 10° C.

Thus, the process of the present invention makes it possible to reuse the filtrate resulting from the filtration step for separating the product, without increasing the diameter of the resulting crosslinked urea-formaldehyde polymer particles to greater than 1.0μ. In industrial production, therefore, the process of the present invention serves not only to solve the problem of environmental pollution by waste water but also to enhance the units of raw materials, thereby bringing about marked economical improvements.

The present invention is further illustrated by the following examples. In these examples, parts and percentages are by weight, unless otherwise indicated.

REFERENCE EXAMPLE 1

A precondensate solution was prepared by dissolving 0.7 part of sodium carboxymethyl cellulose in 42.0 parts of water A (pure water), adding thereto 39.6 parts of 37% formalin and 17.7 parts of urea, and then allowing the resulting mixture to react at a pH of 7 and a temperature of 70° C. for 2 hours (step A). In this case, the precondensate had a molar ratio (F/U) of 1.65. To 100 parts of this precondensate solution was added 144 parts of ca. 2.7% dilute sulfuric acid [98% $H_2SO_4$/water B (pure water)=4/140]. After mixing, the resulting mixture was allowed to stand at approximately 40° C. for 30 minutes (step B). The gel (244 parts) so formed was coarsely crushed with a stainless steel rod, followed by the addition of 40 parts of water C. This mixture was stirred for approximately 2 hours by means of a propeller agitator to form a slurry (step C). After 25 parts of a 20% aqueous solution of urea [urea/water D (pure water)=5/20] was added thereto, the resulting mixture was allowed to react for 20 minutes (step D). This reaction mixture was neutralized with a 20% aqueous solution of sodium hydroxide and then ground finely in a colloid mill to obtain 325 parts of a filler dispersion containing 8.0% of crosslinked urea-formaldehyde polymer particles. The filler dispersion obtained in this non-recycling system will hereinafter be referred to as the filler dispersion of Run No. 1. When the polymer particles were filtered off from the filler dispersion of Run No. 1, dried and then examined by electron microscopy, all of these polymer particles (primary particles) were found to have a diameter of not greater than 1μ.

Using the polymer particles obtained in Run No. 1, paper was made under ordinary conditions. Specifically, 10 parts of the polymer particles, 1 part of rosin size and 3 parts of aluminum sulfate were added to 100 parts of dry pulp, from which paper was made by means of a squared sheet machine. The opacity of the paper so made is given in Table 1. For purposes of comparison, paper was made in the same manner as described above, except that no polymer particles were added. The opacity of this paper was 84.5%.

In this and the following examples, the opacity of paper wad determined according to method A described in JIS-P8138 (1976). Prior to the test, paper samples were conditioned for a period of more than 24 hours by exposure to an atmosphere maintained at a temperature of 21° C. and a relative humidity of 65%. Using a previously constructed correction curve, the measured values of opacity were corrected for the basis weight (in grams per square meter) of the paper sample tested. The corrected values thus obtained, which correspond to a basis weight of 75.0 gr/m², are given in Table 1.

EXAMPLE 1

One example of an experimental procedure for synthesis in a recycling system is described below.

The filler dispersion (325 parts) of Run No. 1, which had been obtained in the manner described in the above Reference Example 1, was filtered to obtain 182 parts of filtrate. Using this filtrate in place of the water A (42 parts) used in step A and the water B (140 parts) used in step B, reaction was carried out in the same manner as described in the above Reference Example 1 [step A (F/U=1.65)→step B→step C→step D by treatment with urea→neutralization→grinding in a colloid mill], so that 325 parts of a filler dispersion was obtained from the 1st recycle. Again, this filler dispersion was filtered to obtain 182 parts of filtrate. Using this filtrate in place of the water A (42 parts) and the water B (140 parts), reaction was carried out in exactly the same manner as described above [step A (F/U=1.65)→step B→step C→step D by treatment with urea→neutralization→grinding in a colloid mill], so that a filler dispersion was obtained from the 2nd recycle. By repeating the above-described procedure again and again, 325 parts of a filler dispersion containing 9.8% of crosslinked urea-formaldehyde polymer particles was obtained from the 10th recycle (Run No. 2). When the polymer particles were filtered off from the filler dispersion of Run No. 2, dried and then examined by electron microscopy, all of these polymer particles (primary particles) were found to have a diameter of not greater than 1μ. Then, using the polymer particles obtained in Run No. 2, paper was made in the same manner as described in Reference Example 1. The opacity of this paper is given in Table 1.

In Run No. 2 which was within the scope of the present invention, the product obtained by repeated recycling of the filtrate exhibited no impairment of its performance as a filler. On the other hand, the filler content of the slurries obtained by repeated recycling of the filtrate (e.g., the slurry of Run No. 2) was approximately 20% higher than that of the slurry obtained by the non-recycling process (Run No. 1). This means that the recycling process of the present invention is advantageous for purposes of industrial production.

EXAMPLE 2

A precondensate solution was prepared by dissolving 0.7 parts of sodium carboxymethyl cellulose in 42.0 parts of water A (pure water), adding thereto 37.9 parts of 37% formalin and 19.4 parts of urea, and then allowing the resulting mixture to react at a pH of 7 and a temperature of 70° C. for 2 hours. In this case, the precondensate had a molar ratio (F/U) of 1.45. Using 100 parts of this precondensate solution, reaction was carried out in exactly the same manner as described in the above Reference Example 1 for producing the filler dispersion of Run No. 1. Thus, 325 parts of a filler dispersion was obtained in the non-recycling system (i.e., without any recycling of the filtrate). Then, this filler dispersion was filtered to obtain 182 parts of filtrate. Using this filtrate in place of the water A (42 parts) and the water B (140 parts), reaction was carried out in the same manner as described in Example 1 [step A (F/U=1.45)→step B→step C→step D by treatment with urea→neutralization→grinding in a colloid mill], so that 325 parts of a filler dispersion was obtained from the 1st recycle. By repeating the above-described procedure again and again, 325 parts of a filler dispersion containing 10.2% of crosslinked urea-formaldehyde polymer particles was obtained from the 10th recycle (Run No. 3). When the polymer particles were filtered off from the filler dispersion of Run No. 3, dried and then examined by electron microscopy, all of these polymer particles (primary particles) were found to have a diameter of not greater than 1μ. Then, using the polymer particles obtained in Run No. 3, paper was made in the same manner as described in Reference Example 1. The opacity of this paper is given in Table 1.

EXAMPLE 3

A precondensate solution was prepared by dissolving 0.7 part of sodium carboxymethyl cellulose in 42.0 parts of water A (pure water), adding thereto 40.9 parts of 37% formalin and 16.4 parts of urea, and then allowing the resulting mixture to react at a pH of 7 and a temperature of 70° C. for 2 hours. In this case, the precondensate had a molar ratio (F/U) of 1.85. Using 100 parts of this precondensate solution, reaction was carried out in exactly the same manner as described in the above Reference Example 1 for the producing the filler dispersion of Run No. 1. Thus, 325 parts of a filler dispersion was obtained in the non-recycling system. Then, this filler dispersion was filtered to obtain 182 parts of filtrate. Using this filtrate in place of the water A (42 parts) and the water B (140 parts), reaction was carried out in the same manner as described in Example 1 [step A (F/U=1.85)→step B→step C→step D by treatment with urea→neutralization→grinding in a colloid mill], so that 325 parts of a filler dispersion was obtained from the 1st recycle. By repeating the above-described procedure again and again, 325 parts of a filler dispersion containing 8.5% of crosslinked urea-formaldehyde polymer particles was obtained from the 10th recycle (Run No. 4). When the polymer particles were filtered off from the filler dispersion of Run No. 4, dried and then examined by electron microscopy, all of these polymer particles (primary particles) were found to have a diameter of not greater than 1μ. Then, using the polymer particles obtained in Run No. 4, paper was made in the same manner as described in Reference Example 1. The opacity of this paper is given in Table 1.

EXAMPLE 4

A precondensate solution was prepared by dissolving 0.7 part of sodium carboxymethyl cellulose in 42.0 parts of water A (pure water), adding thereto 39.6 parts of 37% formalin and 17.7 parts of urea, and then allowing the resulting mixture to react at a pH of 7 and a temperature of 70° C. for 2 hours. In this case, the precondensate had a molar ratio (F/U) of 1.65. To 100 parts of this precondensate solution was added 144 parts of 2.72% dilute sulfuric acid [98% $H_2SO_4$/water B (pure water)=4/140]. After mixing, the resulting mixture was allowed to stand at approximately 40° C. for 30 minutes. The gel (244 parts) so formed was coarsely crushed with a stainless steel rod, followed by the addition of 40 parts of water C. This mixture was stirred for approximately 2 hours by means of a propeller agitator to form a slurry. After 78 parts of 2.5% aqueous ammonia was added thereto, the resulting mixture was allowed to react for 30 minutes. This mixture was adjusted to pH 7-8 and then ground finely in a colloid mill to obtain 362 parts of a filler dispersion containing 6.7% of crosslinked urea-formaldehyde polymer particles. Then, this filler dispersion was filtered to obtain 182 parts of filtrate. Using this filtrate in place of the water A (42 parts) and the water B (140 parts), reaction was carried out in exactly the same manner as described above [step A (F/U=1.65)→step B→step C→step D by treatment with ammonia→pH adjustment→grinding in a colloid mill], so that 362 parts of a filler dispersion was obtained from the 1st recycle. By repeating the above-described procedure again and again, 362 parts of a filler dispersion containing 8.0% of crosslinked urea-formaldehyde polymer particles was obtained from the 10th recycle (Run No. 5). When the polymer particles were filtered off from the filler dispersion of Run No. 5, dried and then examined by electron microscopy, all of these polymer particles (primary particles) were found to have a diameter of not greater than 1μ. Then, using the polymer particles obtained in Run No. 5, paper was made in the same manner as described in Reference Example 1. The opacity of this paper is given in Table 1.

EXAMPLE 5

A precondensate solution was prepared by dissolving 0.7 part of sodium carboxymethyl cellulose in 42.0 parts of water A (pure water), adding thereto 39.6 parts of 37% formalin and 17.7 parts of urea, and then allowing the resulting mixture to react at a pH of 7 and a temperature of 70° C. for 2 hours. In this case, the precondensate had a molar ratio (F/U) of 1.65. To 100 parts of this precondensate solution was added 144 parts of 2.72% dilute sulfuric acid [98% $H_2SO_4$/water B (pure water)=4/140]. After mixing, the resulting mixture was allowed to stand at approximately 40° C. for 30 minutes. The gel (244 parts) so formed was coarsely crushed wtih a stainless steel rod, followed by the addition of 40 parts of water C. This mixture was stirred for approximately 2 hours by means of a propeller agitator to form a slurry. Thereafter, this slurry was neutralized by the addition of approximately 32 parts of a 10% aqueous solution of sodium hydroxide and then ground finely in a colloid mill to obtain 316 parts of a filler dispersion containing 7.4% of crosslinked urea-formaldehyde polymer particles. Then, this filler dispersion was filtered to obtain 182 parts of filtrate. Using this filtrate in place of the water A (42 parts) and the water B (140 parts), reaction was carried out in exactly the same manner as described above [step A (F/U=1.65)→step B→step C→neutralization→grinding in a colloid mill], so that 316 parts of a filler dispersion was obtained from the 1st recycle. By repeating the above-described procedure again and again, 316 parts of a filler dispersion containing 8.6% crosslinked urea-formaldehyde polymer particles was obtained from the 10th recycle (Run No. 6). When the polymer particles were filtered off from the filler dispersion of Run No. 6, dried and then examined by electron microscopy, all of these polymer particles (primary particles) were found to have a diameter of not greater than 1μ. Then, using the polymer particles obtained in Run No. 6, paper was made in the same manner as described in Reference Example 1. The opacity of this paper is given in Table 1.

COMPARATIVE EXAMPLE 1

A precondensate solution was prepared by dissolving 0.7 part of sodium carboxymethyl cellulose in 42.0 parts of water A (pure water), adding thereto 36.5 parts of 37% formalin and 20.8 parts of urea, and then allowing the resulting mixture to react at a pH of 7 and a temperature of 70° C. for 2 hours. In this case, the precondensate had a molar ratio (F/U) of 1.30. Using 100 parts of this precondensate solution, reaction (from step B onward) was carried out in the same manner as described in the above Reference Example 1 for producing the filler dispersion of Run No. 1. Thus, 325 parts of a filler dispersion was obtained in the non-recycling system. Then, this filler dispersion was filtered to obtain 182 parts of filtrate. Using this filtrate in place of the water A (42 parts) and the water B (140 parts), reaction was carried out in the same manner as described above [step A (F/U=1.30)→step B→step C→step D by treatment with urea→neutralization→grinding in a colloid mill], so that 325 parts of a filler dispersion was obtained from the 1st recycle. By repeating the above-described procedure again and again, a filler dispersion was obtained from the 10th recycle (Run No. 7). When the polymer particles were filtered off from the filler dispersion of Run No. 7, dried and then examined by electron microscopy, polymer particles (primary particles) having a diameter of greater than $1\mu$ were found to be present in an amount of approximately 30% by area. The term "% by area" as used herein means the proportion, as expressed in percent, of the area occupied by polymer particles (primary particles) having a diameter of greater than $1\mu$ to the whole area occupied by all polymer particles of a specific field of view of electron microscopy. Then, using the polymer particles obtained in Run No. 7, paper was made in the same manner as described in Reference Example 1. The opacity of this paper is given in Table 1.

COMPARATIVE EXAMPLE 2

A precondensate solution was prepared by dissolving 0.7 part of sodium carboxymethyl cellulose in 42.0 parts of water A (pure water), adding thereto 39.6 parts of 37% formalin and 17.7 parts of urea, and then allowing the resulting mixture to react at a pH of 5 and a temperature of 70° C. for 2 hours. In this case, the precondensate had a molar ratio (F/U) of 1.65. Using 100 parts of this precondensate solution, reaction (from step B onward) was carried out in the same manner as described in the above Reference Example 1 for producing the filler dispersion of Run No. 1. Thus, 325 parts of a filler dispersion was obtained in the non-recycling system. Then, this filler dispersion was filtered to obtain 182 parts of filtrate. Using this filtrate in place of the water A (42 parts) and the water B (140 parts), reaction was carried out in the same manner as described above [step A (pH 5, F/U=1.65)→step B→step C→step D by treatment with urea→neutralization→grinding in a colloid mill], so that 325 parts of a filler dispersion was obtained from the 1st recycle. By repeating the above-described procedure again and again, a filler dispersion was obtained from the 10th recycle (Run No. 8). When the polymer particles were filtered off from the filler dispersion of Run No. 8, dried and then examined by electron microscopy, polymer particles (primary particles) having a diameter of greater than $1\mu$ were found to be present in an amount of approximately 25% by area. Then, using the polymer particles obtained in Run No. 8, paper was made in the same manner as described in Reference Example 1. The opacity of this paper is given in Table 1.

COMPARATIVE EXAMPLE 3

A precondensate solution was prepared by dissolving 0.7 part of sodium carboxymethyl cellulose in 42.0 parts of water A (pure water), adding thereto 39.6 parts of 37% formalin and 17.7 parts of urea, and then allowing the resulting mixture to react at a pH of 11 and a temperature of 70° C. for 2 hours. In this case, the precondensate had a molar ratio (F/U) of 1.65. Using 100 parts of this precondensate solution, reaction (from step B onward) was carried out in the same manner as described in the above Reference Example 1 for producing the filler dispersion of Run No. 1. Thus, 325 parts of a filler dispersion was obtained in the non-recycling system. Then, this filler dispersion was filtered to obtain 182 parts of filtrate. Using this filtrate in place of the water A (42 parts) and the water B (140 parts), reaction was carried out in the same manner as described above [step A (pH 11, F/U=1.65)→step B→step C→step D by treatment with urea→neutralization→grinding in a colloid mill], so that 325 parts of a filler dispersion was obtained from the 1st recycle. By repeating the above-described procedure again and again, a filler dispersion was obtained from the 10th recycle (Run No. 9). When the polymer particles were filtered off from the filler dispersion of Run No. 9, dried and then examined by electron microscopy, polymer particles (primary particles) having a diameter of greater than $1\mu$ were found to be present in an amount of approximately 25% by area. Then, using the polymer particles obtained in Run No. 9, paper was made in the same manner as described in Reference Example 1. The opacity of this paper is given in Table 1.

Next, it will be demonstrated that the objects of the present invention cannot be acomplished by recycling the filtrate to step C. For purposes of clearer demonstration, the amount of water or filtrate used in step C is greater in the following runs than in the foregoing ones, as shown in Table 1.

REFERENCE EXAMPLE 2

A precondensate solution (F/U=1.65) was prepared in the same manner as described in Reference Example 1 (step A). To 100 parts of this precondensate solution was added 44 parts of ca. 8.9% dilute sulfuric acid [98% $H_2SO_4$/water B (pure water)=4/40]. After mixing, the resulting mixture was allowed to stand at approximately 40° C. for 30 minutes (step B). The gel (144 parts) so formed was crushed with a stainless steel rod and in a mortar, folllowed by the addition of 140 parts of water C. This mixture was stirred for approximately 2 hours by means of a propeller agitator to form a slurry (step C). After 25 parts of a 20% aqueous solution of urea [urea/water D (pure water)=5/20] was added thereto, the resulting mixture was allowed to react for 20 minutes (step D). This reaction mixture was neutralized with a 20% aqueous solution of sodium hydroxide and then ground in a colloid mill. Thus, 325 parts of a filler dispersion containing 8.1% of crosslinked urea-formaldehyde polymer particles was obtained in the non-recycling system. This filler dispersion will hereinafter be referred to as the filler dispersion of Run No. 10. When the polymer particles were filtered off from the filler dispersion of Run No. 10, dried and then examined by electron microscopy, all of these polymer particles (primary particles) were found to have a diameter of not greater than $1\mu$. Then, using the polymer particles obtained in Run No. 10, paper was made in the same manner as described in Reference Example 1. The opacity of this paper is given in Table 1.

COMPARATIVE EXAMPLE 4

The filler dispersion (325 parts) of Run No. 10, which had been obtained in the manner described in the above Reference Example 2, was filtered to obtain 160 parts of filtrate. Using this filtrate in place of the water C (140 parts) used in step C and the water D (20 parts) used in step D, reaction was carried out in the same manner as described in the above Reference Example 2 [step A (F/U=1.65)→step B→step C→step D by treatment with urea→neutralization→grinding in a colloid mill], so that 325 parts of a filler dispersion was obtained from the 1st recycle. By repeating the above-described procedure again and again, a filler dispersion was obtained from the 10th recycle (Run No. 11). When the polymer particles were filtered off from the filler dispersion of Run No. 11, dried and then examined by electron microscopy, polymer particles (primary particles) having a diameter of greater than $1\mu$ were found to be present in an amount of approximately 40% by area. Then, using the polymer particles obtained in Run No. 11, paper was made in the same manner as described in Reference Example 1. The opacity of this paper is given in Table 1.

COMPARATIVE EXAMPLE 5

Step A (F/U=1.65) and step B were carried out in the same manner as described in Comparative Example 4. The gel (144 parts) so formed was crushed with a stainless steel rod and in a mortar, followed by the addition of 160 parts of water C (pure water). This mixture was stirred for approximately 2 hours by means of a propeller agitator to form a slurry (step C). After 78 parts of 2.5% aqueous ammonia was added thereto, the resulting mixture was allowed to react for 30 minutes (step D). This mixture was adjusted to pH 7-8 and then ground finely in a colloid mill. Thus, 382 parts of a filler dispersion containing 6.3% of crosslinked urea-formaldehyde polymer particles was obtained in the non-recycling system. Then, this filler dispersion was filtered to obtain 160 parts of filtrate. Using this filtrate in place of the water C (160 parts), reaction was carried out in the same manner as described above [step A (F/U=1.65)→step B→step C→step D by treatment with ammonia→pH adjustment→grinding in a colloid mill], so that 382 parts of a filler dispersion was obtained from the 1st recycle. By repeating the above-described procedure again and again, a filler dispersion was obtained from the 10th recycle (Run No. 12). When the polymer particles were filtered off from the filler dispersion of Run No. 12, dried and then examined by electron microscopy, polymer particles (primary particles) having a diameter of greater than $1\mu$ were found to be present in an amount of approximately 35% by area. Then, using the polymer particles obtained in Run No. 12, paper was made in the same manner as described in Reference Example 1. The opacity of this paper is given in Table 1.

COMPARATIVE EXAMPLE 6

Step A (F/U=1.65) and step B were carried out in the same manner as described in Comparative Example 4. The gel (144 parts) so formed was crushed with a stainless steel rod and in a mortar, followed by the addition of 160 parts of water C (pure water). This mixture was stirred for approximately 2 hours by means of a propeller agitator to form a slurry (step C). Thereafter, this slurry was neutralized by the addition of approximately 32 parts of a 10% aqueous solution of sodium hydroxide and then ground in a colloid mill to obtain 336 parts of a filler dispersion containing 7.0% of crosslinked urea-formaldehyde polymer particles. Then, this filler dispersion was filtered to obtain 160 parts of filtrate. Using this filtrate in place of the water C (160 parts), reaction was carried out in the same manner as described above [step A (F/U=1.65)→step B→step C→neutralization→grinding in a colloid mill], so that 336 parts of a filler dispersion was obtained from the 1st recycle. By repeating the above-described procedure again and again, a filler dispersion was obtained from the 10th recycle (Run No. 13). When the polymer particles were filtered off from the filler dispersion of Run No. 13, dried and then examined by electron microscopy, polymer particles (primary particles) having a diameter of greater than $1\mu$ were found to be present in an amount of approximately 35% by area. Then, using the polymer particles obtained in Run No. 13, paper was made in the same manner as described in Reference Example 1. The opacity of this paper is given in Table 1.

TABLE 1

|  |  |  | Reference Example 1 | Example 1 | Example 2 | Example 3 | Example 4 | Example 5 | Comparative Example 1 | Comparative Example 2 |
|---|---|---|---|---|---|---|---|---|---|---|
| Run No. |  |  | 1 | 2 | 3 | 4 | 5 | 6 | 7 | 8 |
| Number of recycles |  |  | 0 | 10 | 10 | 10 | 10 | 10 | 10 | 10 |
| Synthesis of a precondensate (step A) | Urea/formaldehyde (molar ratio) |  | 1.65 | 1.65 | 1.45 | 1.85 | 1.65 | 1.65 | 1.30 | 1.65 |
|  | Water A | Pure water | 42 | — | — | — | — | — | — | — |
|  |  | Filtrate | — | 42 | 42 | 42 | 42 | 42 | 42 | 42 |
| Solidification reaction (step B) | Water B | Pure water | 140 | — | — | — | — | — | — | — |
|  |  | Filtrate | — | 140 | 140 | 140 | 140 | 140 | 140 | 140 |
| Formation of a slurry (step C) | Water C | Pure water | 40 | 40 | 40 | 40 | 40 | 40 | 40 | 40 |
|  |  | Filtrate | — | — | — | — | — | — | — | — |
| Removal of formaldehyde (step D) | Water D | Pure water | 20 | 20 | 20 | 20 | — | — | 20 | 20 |
|  |  | Filtrate | — | — | — | — | — | — | — | — |
|  | 2.5% aqueous ammonia |  | — | — | — | — | 78 | — | — | — |
| Proportion of particles having a diameter of greater than $1\mu$ (%) |  |  | 0 | 0 | 0 | 0 | 0 | 0 | 30 | 25 |
| Opacity of paper (%) |  |  | 92.5 | 92.6 | 92.2 | 92.5 | 93.5 | 93.2 | 89.5 | 89.9 |
| Remarks | Method for the removal of formaldehyde |  |  | Treatment with urea |  | Treatment with urea | Treatment with ammonia | No treatment |  | Treatment with urea |

TABLE 1-continued

| Classification | | | Prior art | Within the scope of the present invention | Within the scope of the present invention | | | Outside the scope of the present invention | |
|---|---|---|---|---|---|---|---|---|---|
| | | | | | Comparative Example 3 | Reference Example 2 | Comparative Example 4 | Comparative Example 5 | Comparative Example 6 |
| Run No. | | | | | 9 | 10 | 11 | 12 | 13 |
| Number of recycles | | | | | 10 | 0 | 10 | 10 | 10 |
| Synthesis of a precondensate (step A) | Urea/formaldehyde (molar ratio) | | | | 1.65 | 1.65 | 1.65 | 1.65 | 1.65 |
| | Water A | Pure water | | | — | 42 | 42 | 42 | 42 |
| | | Filtrate | | | 42 | — | — | — | — |
| Solidification reaction (step B) | Water B | Pure water | | | — | 40 | 40 | 40 | 40 |
| | | Filtrate | | | 140 | — | — | — | — |
| Formation of a slurry (step C) | Water C | Pure water | | | 40 | 140 | — | — | — |
| | | Filtrate | | | — | — | 140 | 160 | 160 |
| Removal of formaldehyde (step D) | Water D | Pure water | | | 20 | 20 | — | — | — |
| | | Filtrate | | | — | — | 20 | — | — |
| | | 2.5% aqueous ammonia | | | — | — | — | 78 | — |
| Proportion of particles having a diameter of greater than 1μ (%) | | | | | 25 | 0 | 40 | 35 | 35 |
| Opacity of paper (%) | | | | | 89.8 | 92.6 | 89.0 | 90.5 | 90.2 |
| Remarks | Method for the removal of formaldehyde | | | | | Treatment with urea | | Treatment with ammonia | No treatment |
| | Classification | | | | | Prior art | | Outside the scope of the present invention | |

We claim:

1. A process for producing fine particles of crosslinked urea-formaldehyde polymer which comprises the steps of synthesizing a precondensate of urea and formaldehyde, allowing the precondensate to react by the addition of an aqueous solution of an acid catalyst, and then neutralizing the reaction mixture, characterized in that the filtrate resulting from the filtration step for separating the polymer particles is added to the reaction system at a stage of the reaction prior to the formation of a solid material consisting of crosslinked urea-formaldehyde polymer particles and in that the precondensate is obtained by reacting 1.0 mole of urea with 1.4 to 1.9 moles of formaldehyde at a pH of 6 to 10 and a temperature of 10° to 95° C.

2. The process of claim 1 wherein the filtrate is added to the reaction system at the step of synthesizing a precondensate of urea and formaldehyde.

3. The process of claim 1 wherein the filtrate is added to the reaction system at the step of allowing the precondensate to react by the addition of an aqueous solution of an acid catalyst.

4. The process of claim 1 wherein the filtrate is added to the reaction system at the step of synthesizing a precondensate of urea and formaldehyde and the step of allowing the precondensate to react by the addition of an aqueous solution of an acid catalyst.

5. The process of claim 1 wherein the precondensate is obtained by reacting 1.0 mole of urea with 1.5 to 1.8 moles of formaldehyde at a pH of 7 to 9 and a temperature of 50° to 80° C.

6. The process of claim 2 wherein sodium carboxymethyl cellulose is used in the step of synthesizing a precondensate of urea and formaldehyde and the filtrate is used as a solvent for the sodium carboxymethyl cellulose.

7. The process of claim 3 wherein, in the step of allowing the precondensate to react by the addition of an aqueous solution of an acid catalyst, dilute sulfuric acid is used as the aqueous solution of an acid catalyst and the filtrate is used as a diluent for the preparation of the dilute sulfuric acid.

8. The process of claim 1 wherein the reaction for synthesizing the precondensate is carried out for a period of time ranging from 5 minutes to 10 hours.

9. The process of claim 4 wherein sodium carboxymethyl cellulose is used in the step of synthesizing a precondensate of urea and formaldehyde and the filtrate is used as a solvent for the sodium carboxymethyl cellulose.

10. The process of claim 4 wherein, in the step of allowing the precondensate to react by the addition of an aqueous solution of an acid catalyst, dilute sulfuric acid is used as the aqueous solution of an acid catalyst and the filtrate is used as a diluent for the preparation of the dilute sulfuric acid.

* * * * *